Aug. 27, 1963  J. L. KLEINMAN  3,101,802
SCALE-WASHING MACHINE COMBINATION
Original Filed Jan. 3, 1958
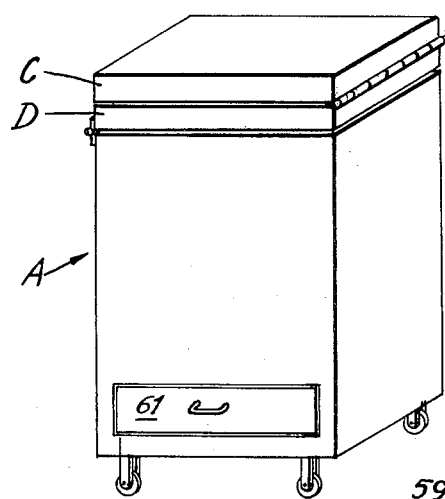
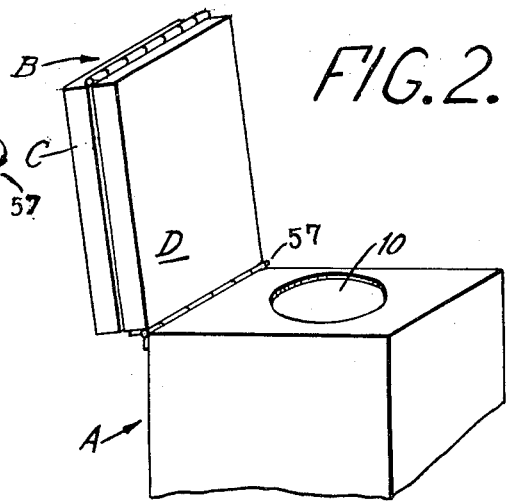
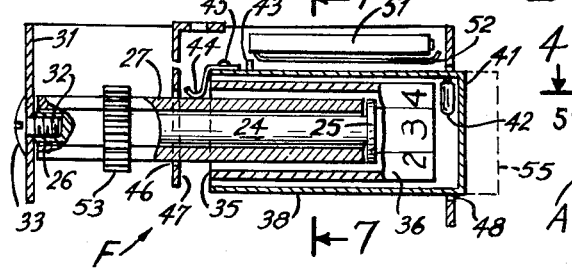
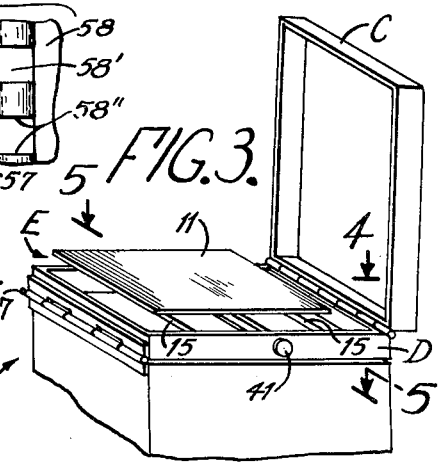
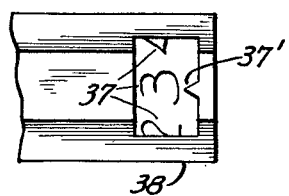
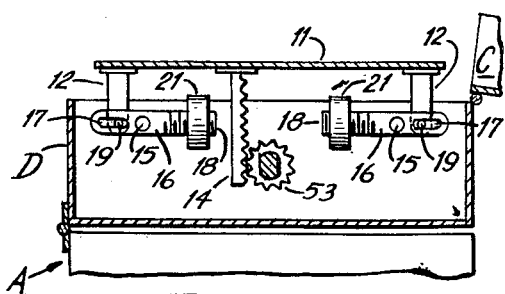
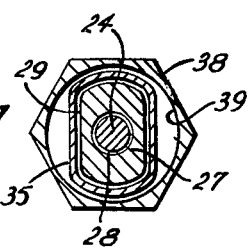
INVENTOR.
Jacob L. Kleinman United States Patent Office 3,101,802
Patented Aug. 27, 1963

3,101,802
SCALE-WASHING MACHINE COMBINATION
Jacob L. Kleinman, Hotel Kimberly, 74th St. at Broadway, New York, N.Y.
Original application Jan. 3, 1958, Ser. No. 707,027. Divided and this application Jan. 23, 1961, Ser. No. 84,448
5 Claims. (Cl. 177—144)

This invention relates to the construction of washing machines in general, and more particularly so to electrically operated, or gas operated, washing machines, or dryers, or a combination of both, provided with weighing means operable uniformly for obtaining proper weight of the laundry or washing-clothes to be placed therein, and is filed as a divisional application of my co-pending application S.N. 707,027, filed Jan. 3, 1958, for Adjustable Scale and Washing Machine Combination.

In accordance with my invention, I produce a washing machine, or drying machine, or a combination of both, provided with a scale-structure wherein the tension of the weighing mechanism is supporting uniformly the weighing platform throughout its structure to ascertain the proper weight of the amount of washing-clothes to be placed into either one of such machines; and wherein such scale-structure may be readily removable for repair or cleaning purposes and be replaceable thereon.

To illustrate the ordinary commercial utility of my invention, in connection with either a washing machine or a drying machine or a combination of both, in daily life, an instrument of this kind constructed in accordance with my invention, of whatever shape, style or type it may be made, can be utilized to great advantage; for example, such weighing means will aid to ascertain the proper weight of the washing-clothes before it is placed into the machine thereby preventing over-loading such machine with washing-clothes and thus prevent or minimize over-straining of the machine motor while operating, and in that way prolonging the life and usefulness of such motor and machine. In addition thereto, such weighing means may be ready for weighing the next load without interrupting or interfering with the washing or drying operation of the machine.

It is thus evident, that an instrument, or structure, of this kind or type, made in accordance with my invention, fulfills a long-felt need in the art of making structures of this sort; it teaches a new and unique form of arrangement of parts not known heretofore in the art of making such machines. It performs new functions and provides new comfort to the user in a manner whereby such machine may become a popular and indispensable household item of commercial value.

For a fuller understanding of the nature and objects of my invention herein, reference is had to the following detailed description in connection with the accompanying drawing, in which:

FIG. 1 is a perspective view of my machine, including my scale structure, in closed position;

FIG. 2 is a perspective view, partly broken away, of my machine having its cover in a hinged-open position;

FIG. 3 is a perspective view of the machine cover, having the upper portion thereof in a hinged-open position, and the lower portion thereof covering the open space of the washing machine, also showing the scale structure carried by the lower portion of the cover, the washing machine partly broken away;

FIG. 4 is a cross-sectional view taken along the line 4—4 of FIG. 3;

FIG. 5 is a cross-sectional view taken along the line 5—5 of FIG. 3;

FIG. 6 is a view of a portion of the scale showing the indicating numerals;

FIG. 7 is a cross-sectional view taken along the line 7—7 of FIG. 5; and

FIG. 8 is a perspective view of the separate hinge portions.

I am showing the several figures or views for illustrative purposes and for a better and clearer understanding of my invention; and not for limitation purposes.

Referring more particularly to the drawing, in which similar reference characters identify similar parts in the several views of the novel structure of my herein invention:

Arrow A indicates my washing machine (or drier, or combination of both) having an opening or spaced section 10' leading into a wash-tub indicated by numeral 10, and a cover element indicated by arrow B for covering such space section 10'.

The cover element B comprises two sections (preferably of hollow shape), an upper section C and a base section D; the base section D may serve as means for covering the open spaced section 10 and for carrying thereon a scale structure (scale structure mechanism indicated by arrow E), and the upper section C serves as means for covering the scale structure mechanism when the latter is not in use.

The scale structure indicated by arrow E may be constructed in any suitable shape or style; but preferably in a manner wherein the platform 11 is suspended, or supported evenly by such mechanism E to an extent whereby uniform weighing tension may be provided enabling such platform 11 to provide, or render, proper weighing facilities to indicate the correct amount (of pounds) of laundry or washing-clothes before it is placed into the machine.

The platform or carrier 11 may be shaped or formed in any suitable or desirable manner; for example, such platform 11 may be provided with a pair of extensions, depending portions or lugs 12 (FIG. 4) and with a rack or notched bar 14. The base section D may be provided with load balancing structure comprising suitably constructed bars or supports 15 for carrying pivotal elements or sections 16. Such elements 16 are each provided with a longitudinal slot or opening 17 and with a screw-threaded end portion 18. A pin 19 is secured within the openings of each of the lugs 12. One of such pins 19 is positioned loosely within one of the slots 17 and the other of such pins 19 is positioned loosely within the other of the slots 17; a weighing-member 21 having a screw-threaded opening is secured in a rotatable manner upon each of the screw-threaded end portions 18.

A rotatable structure, indicated by arrow F, is carried by the base section D. This rotatable structure comprises a circular-shaped shaft 24 having a shoulder portion 25 and a screw-threaded opening 26; upon this shaft 24 is positioned in a rotatable manner a tubular member 27 having a circular-shaped through opening 28 and a non-circular outer face (cross-sectionally thereof) 29.

The shaft 24 is secured to a wall portion 31 of the base section D by suitable means, for example, a screw-threaded element 32 may be positioned within the screw-threaded opening 26 having its head-portion 33 engaging tightly the outer face of the wall portion 31, in a manner bringing the end portion (having the screw-threaded opening 26) close to the inner face of such wall portion 31 for holding the shaft 24 in a fixed stationary position upon the said base section D. The tubular member 27 is shorter in size than that of the length of the shaft 24 and is held in position by the shoulder portion 25 against accidental displacement.

A non-circular-shaped tubular element 35, having a front portion 36 provided with adjustable numerals 37 and with stationary indicator 37′, is carried by the tubular member 27. An elongated non-circular-shaped portion 38 (for example hexagon style or any other suitable structure) provided with a circular-shaped opening 39 is carried by the tubular element 35. Such elongated portion 38 is provided with a front wall 41 and with an electric-bulb 42 located beyond such wall portion 41; the outer face of such elongated portion 38 is provided with a connector 43 and with a spring element 44 secured thereto by suitable means, for example solder, welding, screw or rivet 45. The tubular element 27 is supported by the circular-shaped opening 46 of the angular portion or extension 47, and the elongated portion 38 is supported by the non-circular opening 48. The inner portion of the under section D is provided with an electric-source-containing means 51 having a spring connector 52.

From the above the following will be apparent: When laundry, or other items, is placed upon the platform 11 the supporting lugs 12 will press downwardly upon the end portions of the elements 16 (see numeral 19) and cause such elements 16 to pivot or hinge upon the supports 15 lifting the weighing member 21 upwardly in a manner urging the platform 11 into movements transversely to its base section, thus facilitating weighing action and providing proper weighing means for the material placed upon the platform 11. During such weighing operation the rack 14 will turn or move the gear or toothed wheel 53 which in turn will rotate the tubular member 27 and simultaneously therewith rotating the tubular element 35 bringing certain of the numerals 37 towards the indicator 37′, thus showing or indicating the correct weight of the item positioned upon the platform 11.

To facilitate the reading of the indicating numerals 37, I provided the tubular element 35 with a slidable friction-fit to facilitate its movements upon the tubular member 27, and the tubular elongated portion 38 I provided with a slidable spring element 44 for engaging frictionally the tubular member 27 and simultaneously therewith also engaging the rear-end portion of the tubular element 35; so that if desired, the front portion 41 may be moved outwardly as indicated by the dotted lines 55. Such slidable action will move the numeral-indicating structure outwardly, the connector 43 will engage the spring-connector 52 and light up the bulb 42 thereby illuminating the spaced section containing the indicating numerals 37 for clearer vision.

It is naturally understood that the upper section C, of the cover-structure indicated by arrow B, has to be in an hinged-open position to make the scale-structure available for weighing purposes (as shown in FIG. 3), but when not in use such section C may be hinged back into a position covering the scale-structure (as shown in FIG. 1). Suitable locking arrangements may be provided for holding such sections (C or D) in locked position.

I desire it to be understood that various types of scale-structure may be utilized for the herein purposes, provided however, that the weighing means or platform is supported by uniform weighing tension to render correct weight of the laundry or washing-clothes placed thereon; and that such scale arrangement may be in combination with various types of washing machines, and be located in any suitable position to accomplish the desired purposes; the disclosure herein is shown by way of example and not for limitation purposes.

If desired, the hinge-pin 57 may be removed from the tubular portions 58″ and 59″ of the hinge sections 58 and 59 of either one of the cover sections C or D, and such portions 58″ or 59″ may be rearranged within the spaced sections 58′ or 59′ in a manner removing the scale carrier section D. The disclosures herein are for illustrative purposes and not for limitation purposes.

From the above it will be seen that I have invented and perfected an assembled machine comprising a combination of several individual useful units, such combined structure can be utilized to great advantage; it is a combination of parts performing desirable practical and useful functions; and although I have shown certain preferred forms or illustrations in order to explain and describe the novelty of my invention, yet, by showing such structure, I do not, by any means, limit myself to these structures, nor to the terms used in describing same, as they are for illustrative purposes only. Various suggestions and changes of structure may be resorted to, and I desire it to be understood that I have same in mind when showing and describing this invention, and seek protection by Letters Patent. And although I have mentioned in describing this invention of what material certain parts may be made, how they may be formed, shaped or styled, and how they may be assembled, yet, I desire it to be understood that this structure, or the individual units, or part thereof, may be made of any suitable material, and shaped, formed, styled or arranged in any desirable manner, and assembled in any convenient way, and that various changes may be resorted to without departing from the spirit of this invention.

I claim:

1. In an apparatus for cleaning laundry or the like, the combination of a body portion comprising a wash tub for receiving laundry therein and a scale-structure for weighing said laundry, said tub having a wall provided with an access opening for placing a limited amount of said laundry into the said tub, said body portion having means for covering the said opening, said scale-structure comprising a weighing mechanism provided with a platform, said platform having a plurality of depending portions, a plurality of balance arms located beneath said platform, each one of said plurality of depending portions cooperating with one of said plurality of balance arms, each of said balance arms having an adjustable weighing member, said plurality of depending arms and said plurality of balance arms cooperating to provide uniform platform movement when said laundry is placed upon said platform during a weighing operation.

2. In a structure as set forth in claim 1, wherein the said scale-structure is located at the upper part of the said body portion for being held in a horizontal position for placing said laundry upon said platform.

3. In an apparatus for cleaning laundry or the kind, the combination of a body portion comprising a wash tub for receiving laundry therein and a scale structure for weighing said laundry, said scale structure movable between an operative weighing position and an inoperative position, said tub having a wall provided with an access opening for placing a limited amount of said laundry into said tub, said body portion having covering means for covering said opening, said covering means comprising two sections, the upper of said two sections being hinged to the lower of said two sections, said lower section affixed to said body portion of said cleaning apparatus, said scale structure disposed between said upper and lower sections in inoperative position, said upper section adapted to be pivoted out of engagement with the said lower section to dispose said scale structure in a horizontal operable position for weighing purposes.

4. In a structure as set forth in claim 3, wherein the said scale-structure is carried by said lower section and such lower section is secured into its position by a removable hinge-pin.

5. In an apparatus for cleaning laundry or the like, the combination of a body portion comprising a wash tub having a wall provided with an access opening for placing laundry therein and a scale structure for weighing said laundry, means for covering said access opening, said scale structure comprising a weighing mechanism provided with a base portion and a weighing platform, said weighing platform provided with depending vertical arms, said weighing mechanism including a plurality of balancing sections located beneath said platform, said depending arms and said balancing sections cooperating to retain said platform in a normally suspended position above said base, said balancing sections movable transversely to said base portion for urging said platform to move transversely toward said base until equilibrium position is attained when laundry is placed upon said platform.

References Cited in the file of this patent

UNITED STATES PATENTS

| | | |
|---|---|---|
| 2,057,024 | Gunnison | Oct. 13, 1936 |
| 2,412,270 | Johnston | Dec. 10, 1946 |
| 2,554,672 | Johnston | May 29, 1951 |
| 2,656,236 | Wasemann | Oct. 20, 1953 |
| 2,676,476 | Smith | Apr. 27, 1954 |
| 2,685,441 | Baade | Aug. 3, 1954 |

FOREIGN PATENTS

| | | |
|---|---|---|
| 1,013,063 | France | Apr. 30, 1952 |